United States Patent
Kaufmann et al.

(10) Patent No.: US 12,292,021 B2
(45) Date of Patent: *May 6, 2025

(54) FILTER ELEMENT AND AIR CLEANER ASSEMBLY

(71) Applicant: MANN+HUMMEL GmbH, Ludwigsburg (DE)

(72) Inventors: Michael Kaufmann, Meckenheim (DE); Klaus-Dieter Ruhland, Meckenheim (DE); Timothy S Finn, Morton, IL (US)

(73) Assignee: MANN+HUMMEL GmbH, Ludwigsburg (DE)

( * ) Notice: Subject to any disclaimer, the term of this patent is extended or adjusted under 35 U.S.C. 154(b) by 134 days.

This patent is subject to a terminal disclaimer.

(21) Appl. No.: 18/165,416

(22) Filed: Feb. 7, 2023

(65) Prior Publication Data

US 2023/0175465 A1 Jun. 8, 2023

Related U.S. Application Data

(63) Continuation of application No. 15/010,572, filed on Jan. 29, 2016, now Pat. No. 11,591,993.

(60) Provisional application No. 62/113,740, filed on Feb. 9, 2015.

(51) Int. Cl.
| | |
|---|---|
| *F02M 35/00* | (2006.01) |
| *B01D 46/00* | (2022.01) |
| *B01D 46/10* | (2006.01) |
| *B01D 46/42* | (2006.01) |
| *B01D 50/20* | (2022.01) |
| *B04C 5/28* | (2006.01) |
| *F02M 35/02* | (2006.01) |
| *F02M 35/024* | (2006.01) |

(52) U.S. Cl.
CPC ... *F02M 35/02433* (2013.01); *B01D 46/0002* (2013.01); *B01D 46/0005* (2013.01); *B01D 46/10* (2013.01); *B01D 46/4227* (2013.01); *B01D 50/20* (2022.01); *B04C 5/28* (2013.01); *F02M 35/0201* (2013.01); *B01D 2265/025* (2013.01); *B01D 2275/206* (2013.01)

(58) Field of Classification Search
CPC ......... F02M 35/02433; F02M 35/0201; F02M 35/0203; B01D 46/00; B01D 46/0002; B01D 46/0005; B01D 46/10; B01D 46/4227; B01D 50/002; B01D 2275/206; B04C 5/28
USPC .......................................................... 55/357
See application file for complete search history.

(56) References Cited

U.S. PATENT DOCUMENTS

2015/0176544 A1 * 6/2015 Kaufmann ....... F02M 35/02416
55/425

* cited by examiner

*Primary Examiner* — T. Bennett McKenzie

(57) ABSTRACT

A filter element may include first and second pairs of opposing walls extending along a longitudinal axis of the filter element. The first and second pairs of opposing walls may create a flow passage between an inlet end and an outlet end of the filter element. The filter element may further include filter media configured to separate particulates from air flowing through the flow passage, and a wedge element associated with an exterior surface of at least one of the first pair of opposing walls. The wedge element may be configured to cooperate with an interior surface of a filter housing configured to receive the filter element.

17 Claims, 6 Drawing Sheets

FILTER ELEMENT AND AIR CLEANER ASSEMBLY

CROSS-REFERENCE TO RELATED APPLICATIONS

This U.S. Patent Application is a Continuation of U.S. application Ser. No. 15/010,572 filed 29 Jan. 2016, which claims the benefit of U.S. Provisional Application No. 62/113,740, filed 9 Feb. 2015. The entire contents of U.S. application Ser. No. 15/010,572 and of U.S. Provisional Application No. 62/113,740 incorporated by reference in their entirety to the fullest extent permitted by the law.

TECHNICAL FIELD

The present disclosure relates to a filter element and an air cleaner assembly, and more particularly, to a filter element and an air cleaner assembly including the filter element.

BACKGROUND OF THE INVENTION

Many machines rely on air taken from the surroundings for operation. For example, internal combustion engines often rely on air to assist with combustion of fuel to develop power that may be used to perform work, such as propelling a vehicle and/or operating other devices associated with the vehicle. If particulates such as dust and dirt enter the internal combustion engine via the intake system, they may contaminate the oil and other parts of the engine, which may result in premature wear or damage to parts of the internal combustion engine. In order to prevent this potential premature wear or damage, air filtration devices may be provided to prevent entry of particulates into the internal combustion engine.

Air filtration devices may include filter media that captures particulates as the air passes through the air filtration device. With use, the filter media becomes laden with particulates, thereby increasing the pressure differential across the air filtration device and/or decreasing the efficiency of the engine. As a result, it may be necessary to either clean or replace the filter media, which is often part of a filter element.

Because the filter media of the filter element must be cleaned or replaced, it is desirable for the filter element to be relatively easily removed, often at the worksite. Thus, it is desirable to provide the air filtration device with an assembly and filter element that facilitate easy removal of the filter element from the air filtration assembly without risk of damaging the parts of the air filtration assembly.

Some prior air cleaner assemblies include a filter housing and a filter element received in the filter housing, with a cover provided to close an opening in the filter housing through which the filter element is received and removed. However, in some such assemblies, the filter housing, filter element, and/or cover may include appendages that are easily damaged or that hinder replacement or servicing of the filter element. The filter elements and air cleaner assemblies of the present disclosure may be directed to mitigating or overcoming such possible drawbacks.

SUMMARY OF THE INVENTION

In some aspects of the invention the present disclosure is directed to a filter element including a first pair of opposing walls extending along a longitudinal axis of the filter element. The filter element may further include a second pair of opposing walls extending along the longitudinal axis, wherein the second pair of opposing walls may couple the first pair of opposing walls to one another. The first and second pairs of opposing walls may create a flow passage between an inlet end of the filter element and an outlet end of the filter element in a direction substantially aligned with the longitudinal axis. The filter element may further include filter media associated with the filter element and configured to separate particulates from air flowing through the flow passage. The filter element may also include a wedge element associated with an exterior surface of at least one of the opposing walls of the first pair of opposing walls. The wedge element may be configured to cooperate with an interior surface of a filter housing configured to receive the filter element. Each of the opposing walls of the first pair of opposing walls may have a respective outlet edge at the outlet end of the filter element, wherein the respective outlet edges extend at a first oblique angle with respect to the longitudinal axis. The wedge element may extend at a second oblique angle with respect to the longitudinal axis, wherein the first and second oblique angles are different from one another.

According to a additional aspects, the present disclosure is directed to an air cleaner assembly including a filter housing configured to receive a filter element. The filter housing may include a housing inlet, a housing outlet wall including an outlet aperture configured to be coupled to an air intake conduit, and a pair of opposing housing walls extending between the housing inlet and the housing outlet wall. At least one of the opposing housing walls of the pair of opposing housing walls may include an interior surface including a wedge receiver, and at least one of the opposing housing walls of the pair of opposing housing walls may include an outlet shoulder. The air cleaner assembly may also include a filter element received in the filter housing. The filter element may include a first pair of opposing walls extending along a longitudinal axis of the filter element, and a second pair of opposing walls extending along the longitudinal axis. The second pair of opposing walls may couple the first pair of opposing walls to one another, wherein the first and second pairs of opposing walls create a flow passage between an inlet end of the filter element and an outlet end of the filter element in a direction substantially aligned with the longitudinal axis. The filter element may also include filter media associated with the filter element and configured to separate particulates from air flowing through the flow passage, and a wedge element associated with an exterior surface of at least one of the opposing walls of the first pair of opposing walls. The wedge element may be configured to cooperate with the wedge receiver of the filter housing. Each of the opposing walls of the first pair of opposing walls may have a respective outlet edge at the outlet end of the filter element, wherein the respective outlet edges extend at a first oblique angle with respect to the longitudinal axis. The wedge element may extend at a second oblique angle with respect to the longitudinal axis, wherein the first and second oblique angles are different from one another.

Further aspects of the invention are taught and disclosed in the claims that follow.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Air cleaner assemblies may be used for removing debris, such as dust and dirt, from air entering an internal combustion engine via, for example, an air intake system. Engines may be used to supply power for machines, such as, for example, any type of ground-borne vehicle, such as an automobile, a truck, an agricultural vehicle, and/or a construction vehicle, such as, for example, a wheel loader, a dozer, a track-type tractor, an excavator, a grader, an on-highway track, an off-highway truck, and/or any other vehicle type known to a person skilled in the art. In addition, engines may supply power to any stationary machines, such as, for example, a genset for generating electric power or a pump for pumping a fluid such as water, natural gas, or petroleum. Engines may take the form of, for example, reciprocating-piston internal combustion engines, such as spark-ignition engines or compression-ignition engines, rotary engines, gas turbine engines, and/or engines powered by gasoline, diesel fuel, bio-diesel, ethanol, methanol, and combinations thereof.

Figure 1:
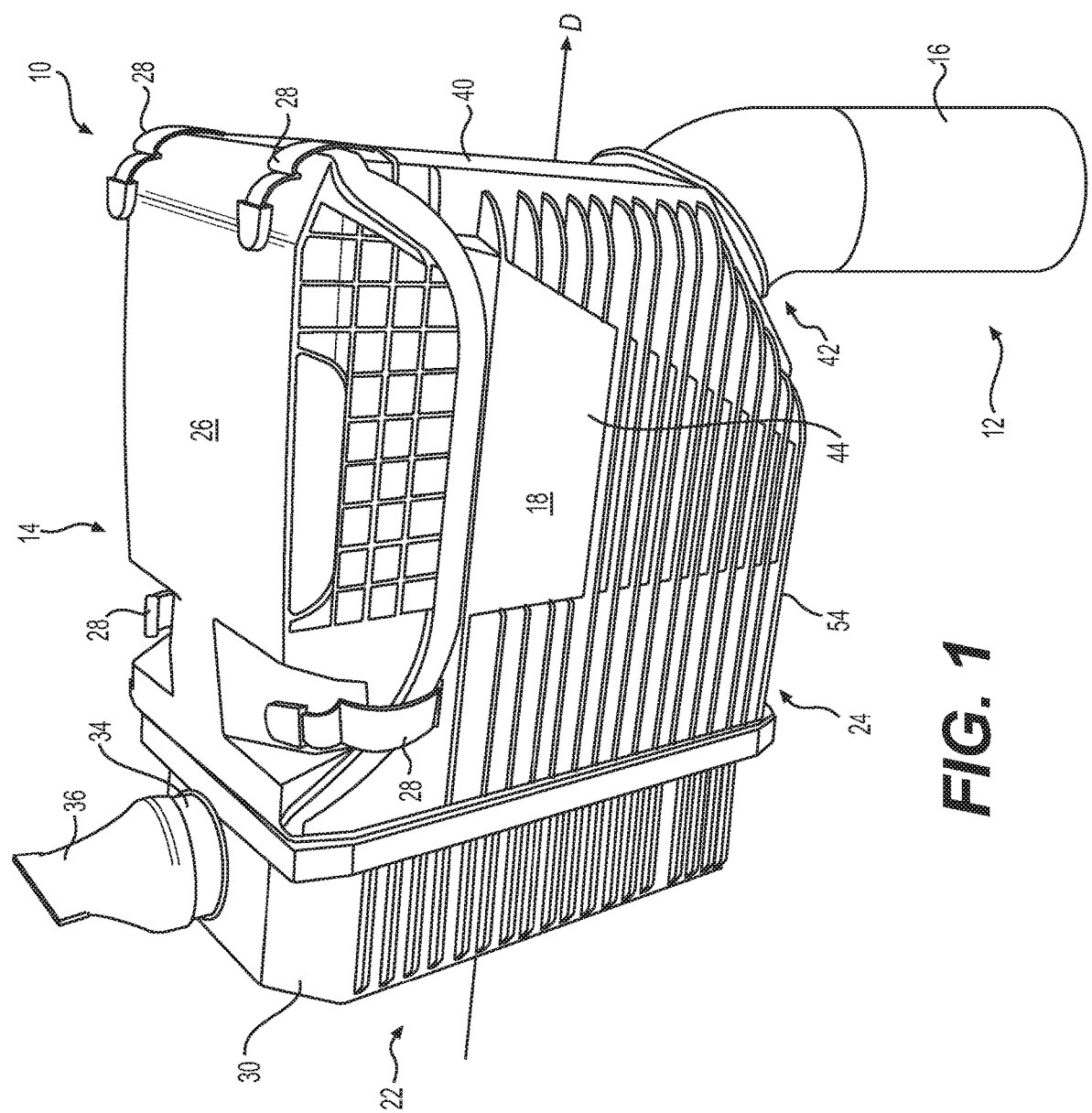
FIG. 1 is a perspective view of an exemplary embodiment of an air cleaner assembly.

As shown in FIG. 1, an exemplary air intake system 10 for an internal combustion engine may include an intake passage 12 for supplying air to the engine. The intake air is drawn through intake passage 12 and into the engine to mix with fuel and assist with combustion in a combustion chamber. In order to clean the air prior to entering the combustion chamber, exemplary air intake system 10 includes an air cleaner assembly 14 and an intake conduit 16 forming intake passage 12. In operation, air is drawn via operation of the engine into intake conduit 16, which is in flow communication with air cleaner assembly 14, where particulates may be removed from the intake air prior to entering intake passage 16 and the combustion chamber of the engine. For example, being drawn-in from the surroundings, the air may contain particulates, such as dust and dirt, particularly if the engine is being operated in dusty environments, such as a construction or mining worksite. Thus, air cleaner assembly 14 may be used to remove at least some of the particulate matter to prevent premature wear or damage to the engine.

Figure 2:
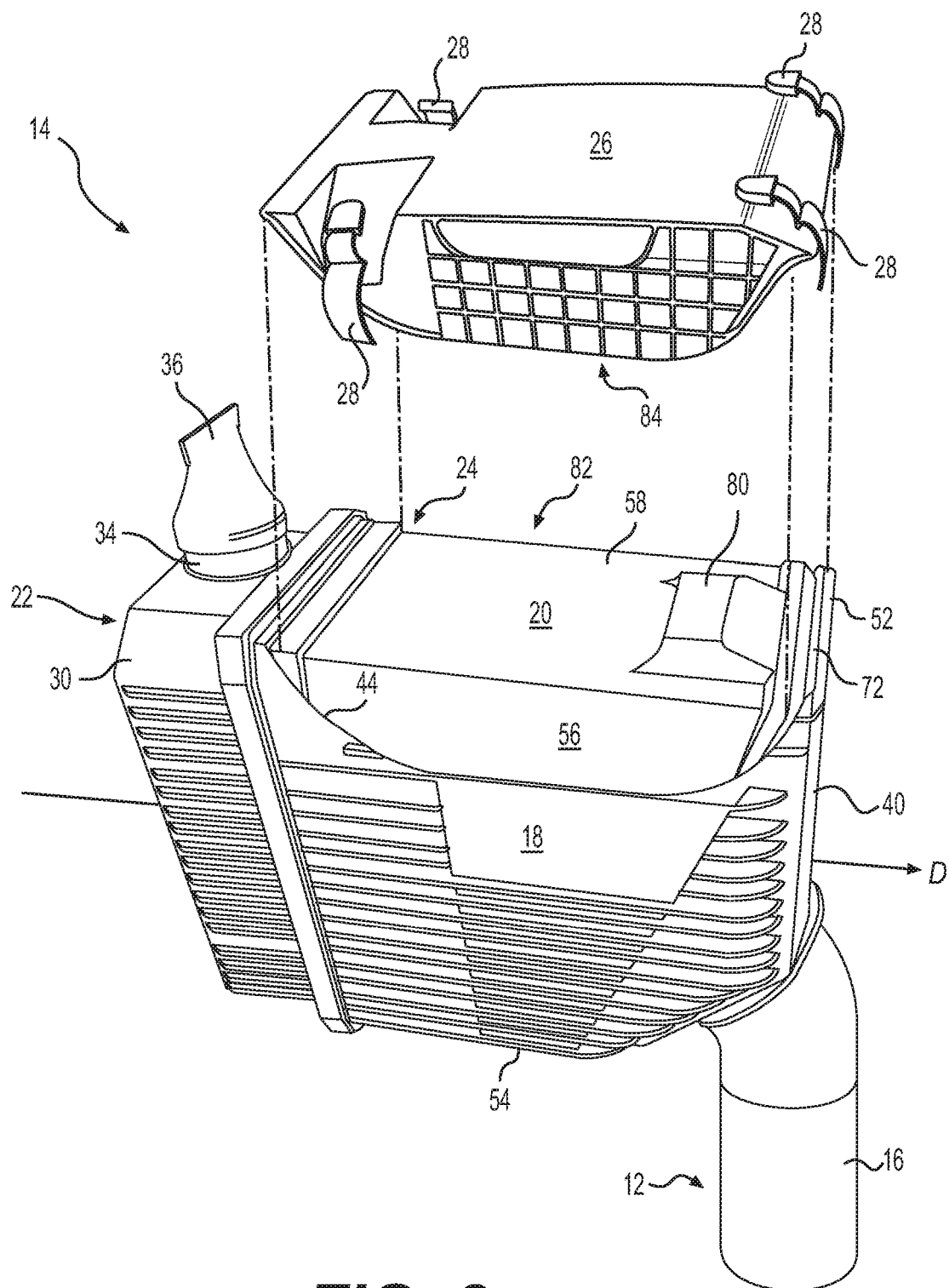
FIG. 2 is an exploded, perspective view of the exemplary air cleaner assembly shown in FIG. 1.

As shown in FIGS. 1 and 2, exemplary air cleaner assembly 14 includes a filter housing 18 configured to receive a filter element 20 (FIG. 2). Air cleaner assembly 14 also includes a precleaner 22 associated with (e.g., coupled to) an inlet end 24 of filter housing 18, and a cover 26 configured to selectively facilitate insertion and removal of filter element 20 from filter housing 18. As shown in FIGS. 1 and 2, filter housing 18 and/or cover 26 may include selectively disengageable fasteners 28 configured to secure cover 26 to filter housing 18. For example, fasteners 28 may include toggle-style latches configured to hold cover 26 securely against a mating surface of filter housing 18. Other types of fasteners are contemplated.

Figure 5:
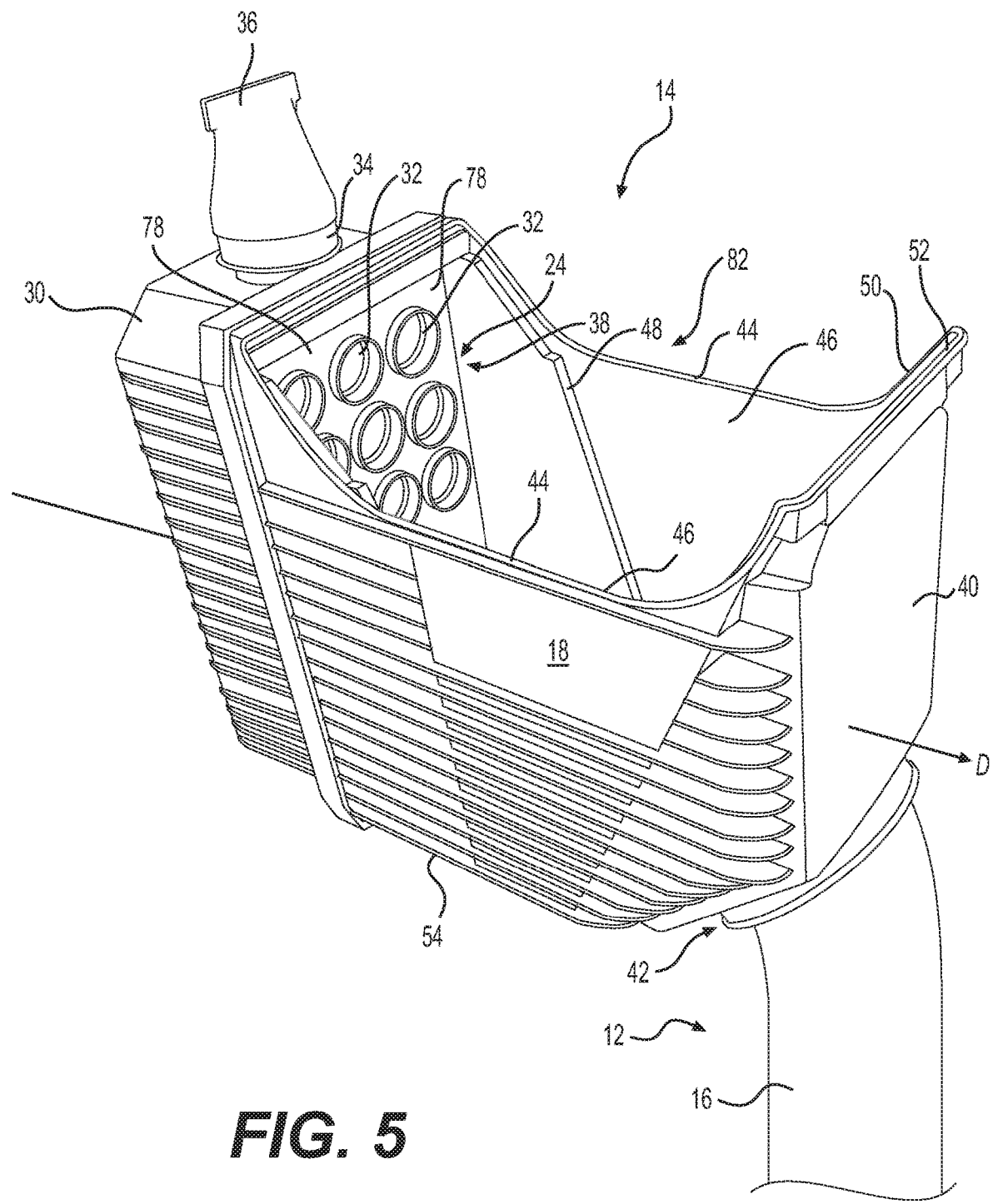
FIG. 5 is a perspective view of an exemplary embodiment of a filter housing.

Exemplary precleaner 22 includes a precleaner inlet housing 30 and a plurality of inlet ports 32 (see FIG. 5). According to some embodiments, inlet ports 32 include cyclone-tube, pre-cleaners configured to cause air entering inlet ports 32 to spin and thereby eject relatively large particles from air entering inlet ports 32. For example, one or more air-directing fins (e.g., several stationary blades, not shown) may cause the air to spin and eject relatively larger particles from the air as it enters precleaner inlet housing 30. In the exemplary embodiment shown, precleaner inlet housing 30 includes a scavenge port 34 associated with precleaner 22 configured to permit removal of the relatively larger particles from precleaner inlet housing 30, According to some embodiments, a valve 36 (e.g., a rubber valve) may be provided at scavenge port 34 for removing collected particles from precleaner inlet housing 30 via scavenge port 34. Once air passes through inlet ports 32, it enters filter housing 18.

As shown in FIGS. 1, 2, 5 and 6, exemplary filter housing 18 includes a housing inlet 38 proximate precleaner 22 for receiving air downstream of precleaner 22. Exemplary filter housing 18 also includes a housing outlet wall 40 including an outlet aperture 42 configured to be coupled to intake conduit 16. Filter housing also includes a pair of opposing housing walls 44 extending between housing inlet 38 and housing outlet wall 40. In particular, exemplary housing walls 44 extend in a longitudinal direction D relative to filter housing 18. In the exemplary embodiment shown, housing walls 44 are substantially planar and substantially parallel to one another. According to some embodiments, they are configured as mirror images of one another.

Figure 6:
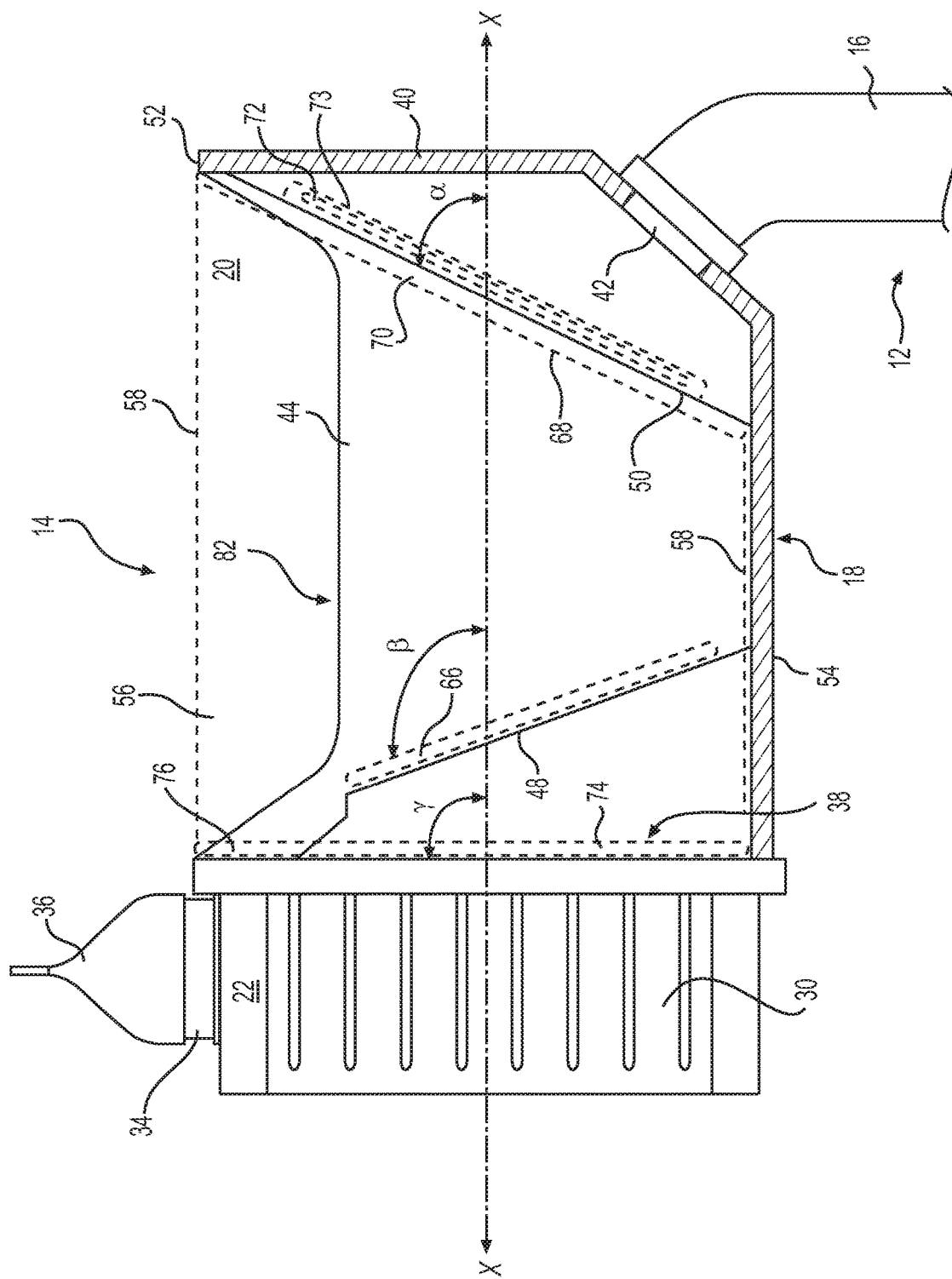
FIG. 6 is a partial section side view of an exemplary embodiment of an air cleaner assembly.

As shown in FIGS. 5 and 6, at least one of housing walls 44 includes an interior surface 46 including a wedge receiver 48 at a position intermediate housing inlet 38 and housing outlet wall 40. As explained in more detail below, wedge receiver 48 is configured to cooperate with a complimentary structure on filter element 20. Wedge receiver 48 may take the form of, for example, a groove, a ridge, a shoulder, and/or one or more protrusions. In the exemplary embodiment shown, wedge receiver 48 is in the form of a shoulder. According to some embodiments, both of opposing housing walls 44 may include a wedge receiver 48.

Figure 3:
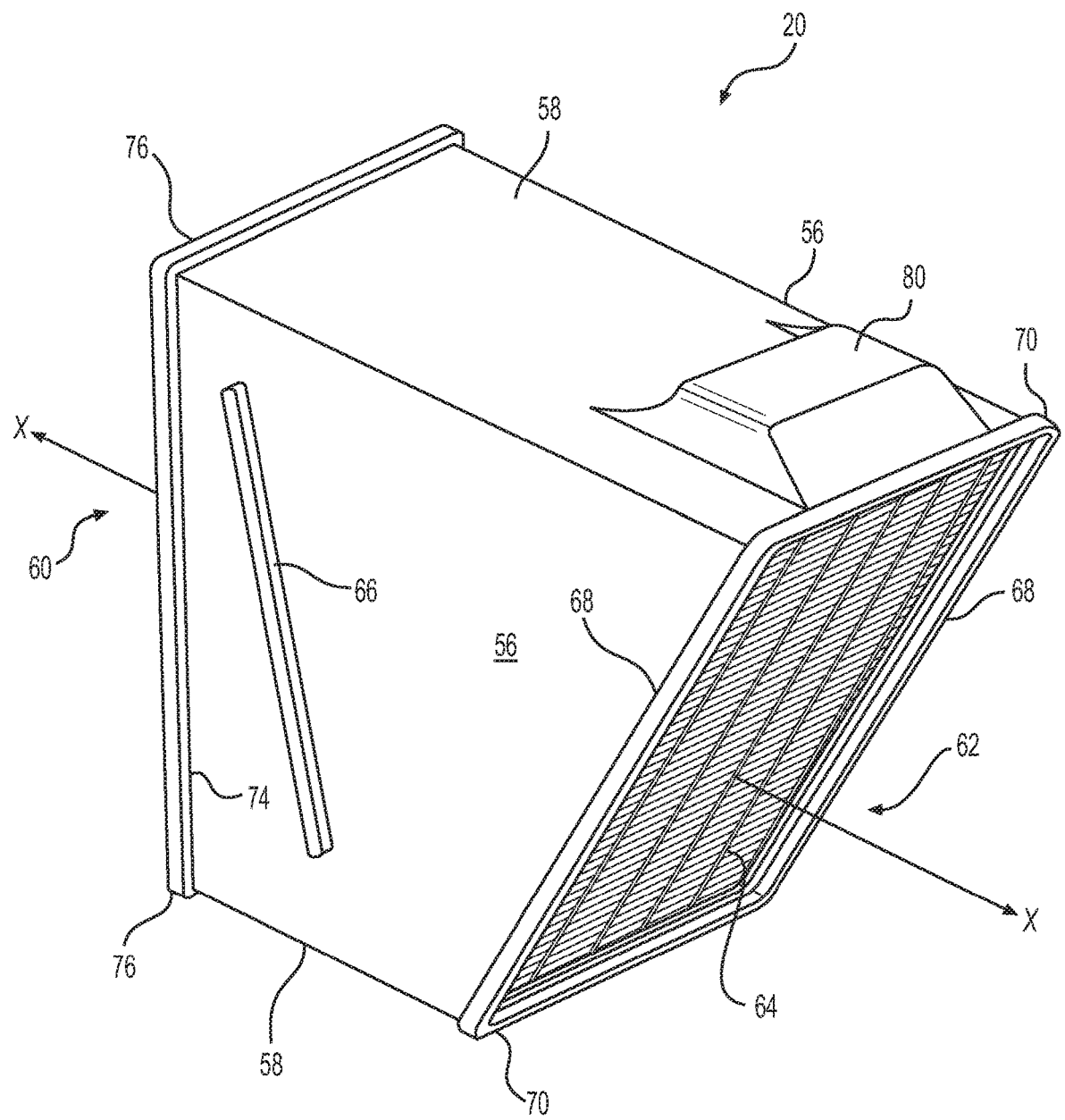
FIG. 3 is a perspective view of an exemplary embodiment of a filter element.
Figure 4:
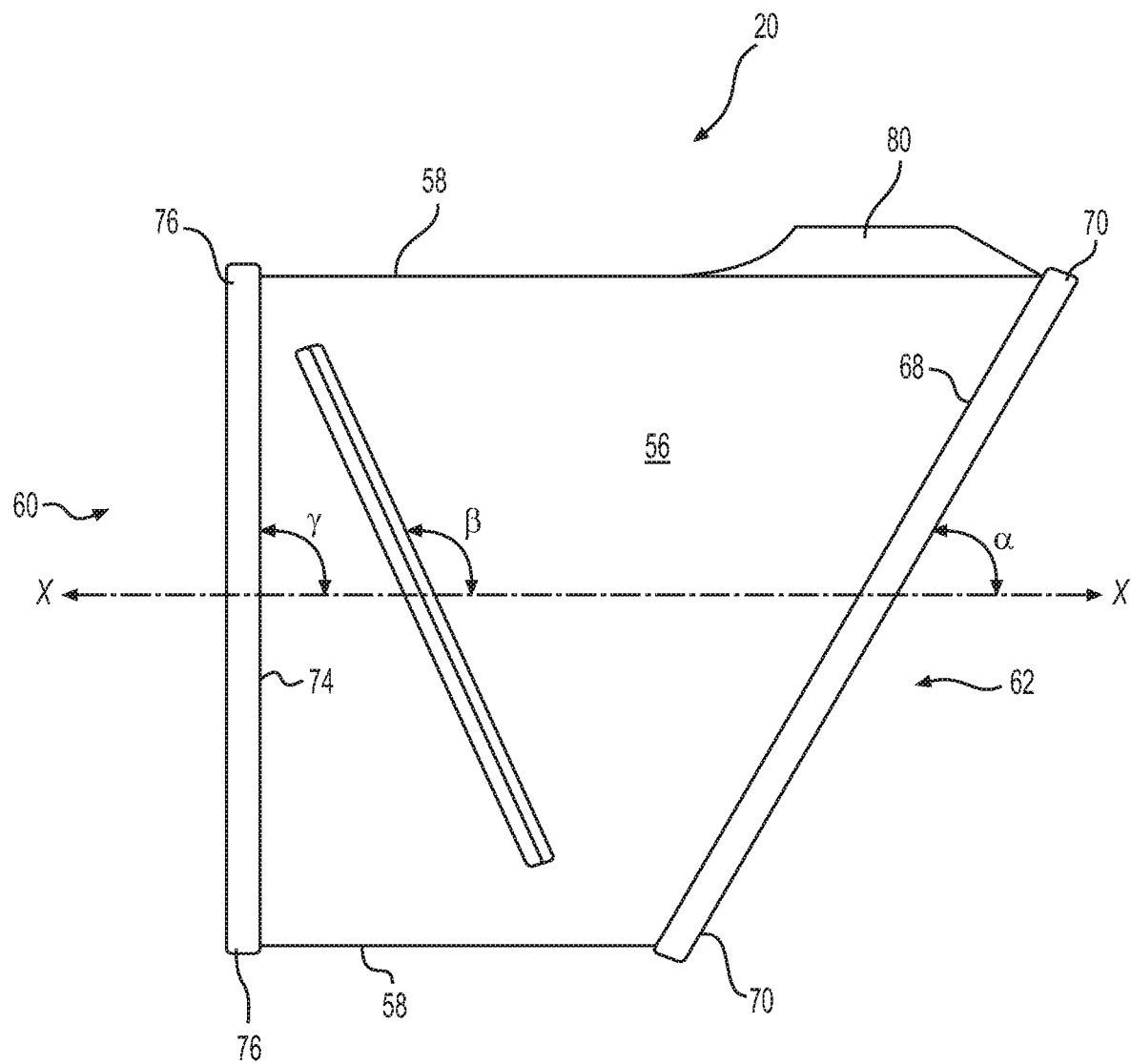
FIG. 4 is a side view of the exemplary filter element shown in FIG. 3.

As shown in FIG. 6, one or more of housing walls 44 may include an outlet shoulder 50 configured to provide a sealing surface for abutting a portion of filter element 20. For example, as shown in FIG. 6, outlet shoulder 50 extends obliquely with respect to longitudinal direction D from an upper edge 52 of housing outlet wall 40 toward a coupling wall 54 (e.g., a bottom wall) that couples opposing housing walls 44 to one another, for example, along respective lower edges of housing walls 44. In the exemplary embodiment shown, outlet shoulder 50 extends toward a position associated with coupling wall 54 intermediate housing outlet wall 40 and wedge receiver 48. According to the exemplary embodiment shown, coupling wall 54 is substantially planar and extends in a direction substantially parallel to longitudinal direction D As shown in FIGS. 2-4, exemplary air cleaner assembly 14 includes filter element 20, which is configured to remove particulate matter in air after it has passed through precleaner 22. In the exemplary embodiment shown, exemplary filter element 20 includes a first pair of opposing walls 56 extending along (e.g., spaced from and in a direction parallel to) a longitudinal axis of filter element 20. In the exemplary embodiment shown, the walls of first pair of opposing walls 56 are substantially planar and substantially parallel to one another. Exemplary filter element 20 also includes a second pair of opposing walls 58 extending along (e.g., spaced from and in a direction parallel to) longitudinal axis X. Second pair of opposing walls 58 (e.g., upper and lower walls) couple the respective walls of first pair of opposing walls 56 to one another. First and second pairs of opposing walls 56 and 58 create a flow-passage between an inlet end 60 of filter element 20 and an outlet end 62 of filter element 20 in a direction substantially aligned with longitudinal axis X.

Exemplary filter element 20 also includes filter media 64 associated with filter element 20 and configured to separate particulates from air flowing through the flow passage. For example, filter media 64 may include pleated filter paper and/or foam, and/or any other filter media material/types and configurations known to those skilled in the art. In the exemplary embodiment shown, filter media 64 is associated with outlet end 62 of filter element 20.

As shown in FIGS. 3 and 4, exemplary filter element 20 also includes a wedge element 66 associated with an exterior surface of at least one of the opposing walls of first pair of opposing walls 56. Wedge element 66 is configured to cooperate with an interior surface of filter housing 18. For example, wedge element 66 is configured to abut wedge receiver 48 of interior surface 46 of at least one of housing walls 44. According to some embodiments, both opposing walls of first pair of opposing walls 56 include opposing wedge elements 66 that are mirror images of each other, and both housing walls 44 include corresponding wedge receivers 48. Wedge element(s) 66 may take the form of, for example, a groove, a ridge, a shoulder, and/or one or more protrusions configured to cooperate with corresponding wedge receiver(s) 48.

As shown in FIGS. 3 and 4, the walls of first pair of opposing walls 56 of exemplary filter element 20 include respective outlet edges 68 at outlet end 62 of filter element 20. In the exemplary embodiment shown, respective outlet edges 68 extend at a first oblique angle with respect to longitudinal axis X. For example, first angle α may range from about 30 degrees to about 80 degrees, such as, for example, from about 45 degrees to about 70 degrees. As shown in FIG. 6, first angle α corresponds to the angle at which outlet shoulder 50 of filter housing 18 extends relative to longitudinal direction D and longitudinal axis A'.

As shown in FIGS. 3, 4 and 6, wedge element 66 is elongated extending at a second oblique angle β with respect to longitudinal axis X. For example, second angle β may range from about 100 degrees to about 150 degrees, such as, for example, from about 110 degrees to about 135 degrees. As shown in FIG. 6, second angle β corresponds to the angle at which wedge receiver 48 of filter housing 18 extends relative to longitudinal direction D and longitudinal axis X.

According to the exemplary embodiment shown, first angle α and second angle β may be oblique angles with respect to longitudinal axis X, and first angle α and second angle β are different from one another. For example, as shown, first angle α is acute with respect to longitudinal axis X, and second angle β is obtuse with respect to longitudinal axis X.

Exemplary filter element 20 includes a seal member 70 associated with outlet end 62 of filter element 20. As shown, exemplary seal member 70 is configured to provide a substantially air-tight seal between outlet end 62 of filter element 20 and another component of air cleaner assembly 14 including at least filter element 20 and filter housing 18 configured to receive filter element 20. For example, seal member 70 may be configured to provide an air-tight seal between outlet end 62 of filter element 20 and outlet shoulder 50 of filter housing 18. Seal member 70 may include any type of material that provides such a seal, such as, for example, gasket material, a bead of silicone or polymer, or other similar material.

As shown in FIGS. 2 and 3, opposing walls of first pair of opposing walls 56 of filter element 20 include respective inlet edges 74 at inlet end 60 of filter element 20. For example, as shown, respective inlet edges 74 extend at an angle γ (FIG. 4) that is substantially perpendicular with respect to longitudinal axis X. According to the exemplary embodiment shown, filter element 20 includes an edge protector 76 associated with inlet end 60 of filter element 20 configured to protect inlet edges 74. According to some embodiments, edge protector 76 may be configured to abut against a precleaner wall 78 of precleaner inlet housing 32. According to some embodiments, edge protector 76 may be configured to be spaced from precleaner wall 78. Edge protector 76 may be formed from materials such as, for example, plastics or other similar materials.

According to some embodiments, filter element 20 may include a structure configured to facilitate insertion and removal of filter element 20 from filter housing 18. For example, in the exemplary embodiment shown in FIGS. 3 and 4, filter element 20 includes a grip 80 associated with one of the opposing walls of second pair of opposing walls 58 (e.g., an upper wall). Exemplary grip 80 is configured to facilitate ease of insertion and removal of filter element 20 from filter housing 18.

As shown in FIG. 6, wedge element 66 of filter element 20 (shown in dashed lines for clarity) and wedge receiver 48 of filter housing 18 are configured to cooperate with one another to bias outlet edges 68 of filter element 20 toward housing outlet wall 40. For example, as filter element 20 is received or installed in filter housing 18 such that a lower one of second pair of opposing walls 58 approaches or reaches coupling wall 54 of filter housing 18, wedge element 66 engages wedge receiver 48 via, for example, sliding against or abutting wedge receiver 48, which, in turn, drives filter element 18 toward housing outlet wall 40 of filter housing 18. As a result, outlet edges 68 of filter element 20 press against outlet shoulder 50 of filter housing 18, thereby creating a sealing surface between filter element 20 and filter housing 18. In embodiments including seal member 70 at outlet end 62 of filter element 20, a substantially air-tight seal may be provided between filter element 20 and filter housing 18. According to some embodiments, a seal member may be provided on the surface of outlet shoulder 50 facing filter element 20. Cooperation between wedge element 66 and wedge receiver 48 may tend to compress seal member 70 against outlet shoulder 50, thereby improving the seal between filter element 20 and filter housing 18.

In the exemplary embodiment shown, filter housing 18 includes an opening 82 between opposing housing walls 44 configured to facilitate insertion and removal of filter element 20 from filter housing 18, and air cleaner assembly 14 includes cover 26 configured to close opening 82. For example, cover 26 includes an interior side 84 configured to abut filter element 20 (e.g., an upper surface of filter element 20) when filter element 20 is received in filter housing 18, and cover 26 is coupled to filter housing 18 to close opening 82, such that wedge element 66 of filter element 20 cooperates with wedge receiver 48 of filter housing 18 to bias outlet edges 68 of filter element 20 toward housing outlet wall 40 of filter housing 18. For example, interior side 84 of cover 26 may include protrusions or similar structures that press against filter element 20 when cover 26 is secured to filter housing 18 via, for example, fasteners 28.

According to some embodiments, for example, as shown in FIG. 6, air cleaner assembly 14 may include a secondary element 72 (e.g., a safety element) configured to provide an additional filtration capability to air cleaner assembly 14. For example, secondary element 72 may be substantially planar as shown, and may include filter media and/or webbing configured to prevent debris from entering outlet aperture 42 and intake conduit 16, for example, in the event that filter element 20 is either damaged (e.g., a portion of filter media 64 is compromised or missing), or filter element 20 is not present in filter housing 18.

Under such circumstances, secondary element 72 may temporarily provide sufficient filtration to prevent damage to the engine. According to some embodiments, secondary element 72 may include a seal member extending around its periphery.

The exemplary embodiment shown in FIG. 6 includes exemplary secondary element 72 received in a recess 73 (shown in dashed lines for clarity), for example, within the inner periphery of outlet shoulder 50. As noted above, wedge element 66 of filter element 20 and wedge receiver 48 of filter housing 18 are configured to cooperate with one another to bias outlet edges 68 of filter element 20 against outlet shoulder 50. Although filter element 20 substantially covers secondary element 72, it does not necessarily make contact with or press against secondary element 72 in recess 73. For example, according to some embodiments secondary element 72 is retained in recess 73 of filter housing 18 without any assistance from filter element 20,

INDUSTRIAL APPLICABILITY

The filter elements and air cleaner assemblies disclosed herein may be used to remove particulates from air entering a machine that relies on air flow for operation. For example, internal combustion engines combine air and fuel for combustion to develop power that may be used to perform work, such as propelling a vehicle and/or operating other devices associated with the vehicle. The air filters and air cleaner assemblies may be used to prevent entry of particulates into the internal combustion engine to reduce or prevent contamination of the oil and other parts of the engine that may lead to premature wear or damage to parts of the internal combustion engine.

According to some embodiments, filter housing 18, filter element 20, and/or cover 26 may provide an air cleaner assembly 14 that facilitates ease of servicing of filter element 20, while providing an effective air cleaner assembly. For example, filter housing 18, filter element 20, and/or cover 26 do not have appendages that may be easily damaged or hinder removal and replacement of filter element 20 in air cleaner assembly 14. In addition, some embodiments of wedge element 66 and wedge receiver 48 may substantially ensure that filter element 20 is pressed toward housing outlet wall 40 of filter housing 18, such that a substantially air-tight seal is provided between filter housing 18 and filter element 20.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A filter element comprising:
   a first pair of opposing walls extending along a longitudinal axis of the filter element, the longitudinal axis defining an axial direction;
   a second pair of opposing walls extending along the longitudinal axis, the second pair of opposing walls coupling the first pair of opposing walls to one another, wherein the first and second pairs of opposing walls create a flow passage between an inlet end of the filter element and an outlet end of the filter element in a direction substantially aligned with the longitudinal axis;
   filter media positioned within the flow passage formed by the first and second pair of opposing walls and configured to separate particulates from air flowing through the flow passage; and
   a planar inlet flow surface formed at the inlet end of the filter element;
   a planar outlet flow surface formed at the outlet end of the filter element, the planar outlet flow surface oriented at a first oblique angle with respect to the longitudinal axis;
   wherein the longitudinal axis extends through the filter media from the planar inlet flow surface to the planar outlet flow surface;
   a seal member positioned on a perimeter of the outlet end of the filter element, at least a portion of the seal member extending outwardly from the planar outlet flow surface, and the seal member configured to abut and compress against an outlet shoulder of a filter housing to create a substantially air-tight seal between the outlet end of the filter element and the outlet shoulder of the filter housing configured to receive the filter element;
   wherein the first pair of opposing walls each have an exterior surface, at least one of the first pair of opposing walls having an elongated wedge element arranged thereon and elongated on the exterior surface and projecting outwardly therefrom;
   wherein the elongated wedge element is arranged in the axial direction between and spaced in the axial direction away from the planar inlet flow surface and the planar outlet flow surface;

wherein the elongated wedge element is elongated linearly at a second oblique angle with respect to the longitudinal axis;
wherein the elongated wedge element is configured to engage against a wedge receiver located on an interior surface of the filter housing to urge the seal member to abut and compressively seal against the outlet shoulder of the filter housing.

2. The filter element of claim 1, wherein
the first oblique angle is acute with respect to the longitudinal axis, and
wherein the second oblique angle is obtuse with respect to the longitudinal axis.

3. The filter element of claim 1, wherein
the first pair of opposing walls are substantially planar and substantially parallel with respect to one another.

4. The filter element of claim 1, wherein
each of the opposing walls of the first pair of opposing walls has a respective inlet edge at the inlet end of the filter element,
wherein the respective inlet edges extend at an angle substantially perpendicular with respect to the longitudinal axis.

5. The filter element of claim 1, wherein
the opposing walls of the first pair of opposing walls are substantially perpendicular with respect to the opposing walls of the second pair of opposing walls.

6. The filter element of claim 1, wherein
the filter media is associated with the outlet end of the filter element.

7. The filter element of claim 1, further including
a grip associated with one of the opposing walls of the second pair of opposing walls, the grip being configured to facilitate insertion and removal of the filter element from the filter housing.

8. The filter element of claim 1, wherein
the elongated wedge elements forms a negative slope with respect to the longitudinal axis and
the planar outlet flow surface forms a positive slope with respect to the longitudinal axis.

9. An air cleaner assembly comprising:
a filter housing configured to receive a filter element, the filter housing including:
  a housing inlet,
  a housing outlet wall including an outlet aperture configured to be coupled to an air intake conduit,
  a pair of opposing housing walls extending between the housing inlet and the housing outlet wall, at least one of the opposing housing walls of the pair of opposing housing walls including
    an interior surface including a wedge receiver, and
  at least one of the opposing housing walls of the pair of opposing housing walls including
    an outlet shoulder; and
a filter element received in the filter housing, the filter element including:
  a first pair of opposing walls extending along a longitudinal axis of the filter element, the longitudinal axis defining an axial direction;
  a second pair of opposing walls extending along the longitudinal axis, the second pair of opposing walls coupling the first pair of opposing walls to one another,
  wherein the first and second pairs of opposing walls create a flow passage between an inlet end of the filter element and an outlet end of the filter element in a direction substantially aligned with the longitudinal axis;
  filter media positioned within the flow passage formed by the first and second pair of opposing walls and configured to separate particulates from air flowing through the flow passage;
  a planar inlet flow surface formed at the inlet end of the filter element;
  a planar outlet flow surface formed at the outlet end of the filter element, the planar outlet flow surface oriented at a first oblique angle with respect to the longitudinal axis;
wherein the longitudinal axis extends through the filter media from the planar inlet flow surface to the planar outlet flow surface;
  a seal member positioned on a perimeter of the outlet end of the filter element, at least a portion of the seal member extending outwardly from the planar outlet flow surface, and the seal member configured to abut and compress against the outlet shoulder of the filter housing to create a substantially air-tight seal between the outlet end of the filter element and the outlet shoulder of the filter housing configured to receive the filter element;
wherein the first pair of opposing walls each have an exterior surface, at least one of the first pair of opposing walls having an elongated wedge element arranged thereon and elongated on the exterior surface and projecting outwardly therefrom;
wherein the elongated wedge element is arranged in the axial direction between and spaced in the axial direction away from the planar inlet flow surface and the planar outlet flow surface;
wherein the elongated wedge element is elongated linearly at a second oblique angle with respect to the longitudinal axis;
wherein the elongated wedge element is configured to engage against the wedge receiver of the filter housing to urge the seal member to abut and compressively seal against the outlet shoulder of the filter housing.

10. The air cleaner assembly of claim 9, wherein
the first oblique angle is acute with respect to the longitudinal axis, and
wherein the second oblique angle is obtuse with respect to the longitudinal axis.

11. The air cleaner assembly of claim 9, wherein
the filter housing includes
  an opening between the pair of opposing housing walls configured to facilitate insertion and removal of the filter element from the filter housing, and
wherein the air cleaner assembly further includes
  a cover configured to close the opening.

12. The air cleaner assembly of claim 11, wherein
the cover includes
  an interior side configured to abut the filter element when the filter element is received in the filter housing, and
  the cover is coupled to the filter housing to close the opening, such that the elongated wedge elements of the filter element cooperates with the wedge receiver of the filter housing to urge the seal member to abut and compressively seal against the outlet shoulder of the filter housing.

13. The air cleaner assembly of claim 9, further including
   a substantially planar secondary element between the filter element and the housing outlet wall of the filter housing.
14. The air cleaner assembly of claim 9, wherein
   the opposing walls of the first pair of opposing walls are substantially perpendicular with respect to the opposing walls of the second pair of opposing walls.
15. The air cleaner assembly of claim 9, further including
   a precleaner associated with the housing inlet and configured to separate relatively larger debris from air flowing into the housing inlet prior to entering the filter element.
16. The air cleaner assembly of claim 15, further including
   a scavenge port associated with the precleaner and configured to facilitate removal of debris from the precleaner.
17. The air cleaner assembly of claim 9, wherein
   the elongated wedge elements forms a negative slope with respect to the longitudinal axis and
   the planar outlet flow surface forms a positive slope with respect to the longitudinal axis.

* * * * *